United States Patent
Hong et al.

(10) Patent No.: US 10,737,968 B2
(45) Date of Patent: Aug. 11, 2020

(54) METHOD AND APPARATUS FOR CUTTING A GLASS LAMINATE

(71) Applicant: Corning Precision Materials Co., Ltd., Asan (KR)

(72) Inventors: Sang Jin Hong, Goyang-si (KR); Joon-Soo Kim, Yongin-si (KR); Sang Yoon Oh, Cheonan (KR); Dong Keun Shin, Hwasung-si (KR); Min Soo Song, Cheonan-si (KR)

(73) Assignee: CORNING PRECISION MATERIALS CO., LTD (KR)

( * ) Notice: Subject to any disclaimer, the term of this patent is extended or adjusted under 35 U.S.C. 154(b) by 168 days.

(21) Appl. No.: 15/749,245

(22) PCT Filed: Jul. 29, 2016

(86) PCT No.: PCT/KR2016/008408
§ 371 (c)(1),
(2) Date: Jan. 31, 2018

(87) PCT Pub. No.: WO2017/023052
PCT Pub. Date: Feb. 9, 2017

(65) Prior Publication Data
US 2019/0127262 A1    May 2, 2019

(30) Foreign Application Priority Data
Jul. 31, 2015 (KR) .................. 10-2015-0108569

(51) Int. Cl.
*B24B 7/24* (2006.01)
*C03B 33/07* (2006.01)
(Continued)

(52) U.S. Cl.
CPC .............. *C03B 33/07* (2013.01); *B24B 7/241* (2013.01); *C03B 33/02* (2013.01); *C03B 33/027* (2013.01);
(Continued)

(58) Field of Classification Search
CPC ....... C03B 33/07; C03B 33/02; C03B 33/027; C03B 33/03; C03B 33/033; C03B 33/076; B24B 7/241
(Continued)

(56) References Cited

U.S. PATENT DOCUMENTS 5,183,373 A   2/1993   Floyd, Jr.
7,717,311 B2  5/2010   Nishio
(Continued)

FOREIGN PATENT DOCUMENTS

CN   103936272 A   7/2014
EP   2891635 A1    7/2015
(Continued)

OTHER PUBLICATIONS

International Search Report of the International Searching Authority; PCT/KR2016/008408; dated Nov. 8, 2016; 2 Pages; Korean Intellectual Property Office.
(Continued)

*Primary Examiner* — George B Nguyen (57) ABSTRACT

A method and apparatus for cutting a glass laminate. A trench line is formed in a glass substrate that is an uppermost layer of a glass laminate by scoring a surface of the glass substrate. The glass laminate is cut in the direction parallel to the trench line. It is possible to prevent the propagation of cracks commonly formed during the cutting of glass laminates.

14 Claims, 5 Drawing Sheets

(51) Int. Cl.
    *C03B 33/02*          (2006.01)
    *C03B 33/027*        (2006.01)
    *C03B 33/03*          (2006.01)
    *C03B 33/033*        (2006.01)

(52) U.S. Cl.
    CPC ............ *C03B 33/03* (2013.01); *C03B 33/033*
                    (2013.01); *C03B 33/076* (2013.01)

(58) Field of Classification Search
    USPC ........................................................ 451/41
    See application file for complete search history.

(56) References Cited

U.S. PATENT DOCUMENTS

| | | |
|---|---|---|
| 8,784,157 B2 | 7/2014 | Bando |
| 2004/0074366 A1* | 4/2004 | Choo ..................... C03B 33/03 83/886 |
| 2006/0158601 A1* | 7/2006 | Lee ....................... C03B 33/033 349/156 |
| 2006/0236840 A1* | 10/2006 | McGlinchy ............ B24B 7/075 83/879 |
| 2006/0285064 A1* | 12/2006 | Lee ....................... C03B 33/037 349/187 |
| 2010/0089961 A1* | 4/2010 | Shin ................... B23K 26/0876 225/2 |
| 2013/0155004 A1 | 6/2013 | Yoshikawa |
| 2013/0233479 A1 | 9/2013 | Kurimura et al. |
| 2014/0042202 A1 | 2/2014 | Lee |

FOREIGN PATENT DOCUMENTS

| | | | |
|---|---|---|---|
| JP | 2003114420 A * | 4/2003 | ........... C03B 33/074 |
| JP | 2003221252 A | 8/2003 | |
| JP | 2012057914 A | 3/2012 | |
| JP | 2012201573 A | 10/2012 | |
| KR | 634750 B1 | 10/2006 | |
| KR | 916539 B1 | 9/2009 | |
| KR | 1140164 B1 | 4/2012 | |
| WO | 2009060691 A1 | 5/2009 | |
| WO | 2011019299 A1 | 2/2011 | |

OTHER PUBLICATIONS

English Translation of CN201680045147.X First Office Action dated Jan. 15, 2019, China Patent Office, 8 Pgs.

EP16833288 Office Action and Search Report dated Feb. 11, 2019, European Patent Office, 9 Pgs.

* cited by examiner

METHOD AND APPARATUS FOR CUTTING A GLASS LAMINATE

BACKGROUND

Field

The present disclosure generally relates to a method and apparatus for cutting a glass laminate. More particularly, the present disclosure relates to a method and apparatus for cutting a glass laminate able to prevent the propagation of cracks commonly formed during the cutting of glass laminates.

Description of Related Art

In general, glass has a variety of applications in various fields, for example, as windows, substrates for electronic devices, and kitchen furniture, due to the characteristics thereof, such as high optical transparency, high hardness, uniform flatness, and high thermal endurance. In line with various technological advances, the thickness of glass is continuously decreasing. In particular, the unique compositions of specialty glass produced by specialized companies and the development of quality management have lead to the current state of the art, in which a large flexible glass substrate having a thickness of 0.3 mm that may be distributed in the shape of a roll is able to be manufactured.

Such thin glass substrates are bonded to a variety of rigid substrates, thereby forming a glass laminate, which may then be used in a variety of fields of application. For example, a glass laminate applicable to furniture or kitchen doors may be manufactured by bonding a glass substrate to a decorative film formed of, for example, polyvinyl chloride (PVC) or polyethylene terephthalte (PET), by a roll-to-roll lamination process; cutting the resultant substrate in the widthwise direction and the lengthwise direction thereof to have the shape of a sheet; and bonding the resultant sheet to a rigid substrate, such as a medium density fiberboard (MDF). The glass laminate manufactured in this manner is finally cut to have a shape and a size required for a product.

In related-art approaches for cutting a glass laminate, a scribing wheel is used. In this case, although the glass substrate can be cut, the scribing wheel may fail to cut the MDF, the base substrate, whereby the glass laminate may not be completely cut. In addition, the application of a high-power laser to the cutting of a glass laminate leads to an advantage of a high cutting speed. However, there may be a problem in that the MDF may burn at an extremely high temperature induced by a laser beam. Furthermore, a water jet used in the related-art cutting approaches is impractical, since the MDF is vulnerable to water.

As another approach, a cutting method using, for example, a router bit, a band saw, or a blade saw, may be considered for cutting the MDF. However, when the glass laminate is cut using such a tool, a defect, such as a micro-crack, may be formed in a cut portion by force applied thereto during the cutting and may subsequently propagate over the entire surface of the glass substrate, leading to product defects.

The information disclosed in the Background section is only provided for a better understanding of the background and should not be taken as an acknowledgment or any form of suggestion that this information forms prior art that would already be known to a person skilled in the art.

RELATED ART DOCUMENT

Patent Document 1: Korean Patent No. 10-0657197 (Dec. 7, 2006)

BRIEF SUMMARY

Various aspects of the present disclosure provide a method and apparatus for cutting a glass laminate able to prevent the propagation of cracks that would be formed while glass laminates are being cut.

According to an aspect, a method of cutting a glass laminate includes: forming a trench line in a surface of a glass substrate that is an uppermost layer of a glass laminate by scoring the surface of the glass substrate; and cutting the glass laminate in a direction parallel to the trench line.

In the scoring operation, the trench line may be formed to a depth ranging 10% to 20% of the thickness of the glass substrate.

A median crack may be formed under the trench line in the glass substrate.

The depth of the median crack from the surface of the substrate may range from 10% to 65% of the thickness of the glass substrate.

The surface of the glass substrate may be scored using a scribing wheel.

In the cutting operation, the glass laminate may be cut such that the distance between a cut section of the glass laminate and the center of the trench line ranges from 10 μm to 100 μm.

The glass laminate may be cut using a router bit.

The method may further include, after the cutting operation, polishing the cut section of the glass laminate.

The glass laminate may further include a base substrate bonded to the glass substrate.

The thickness of the glass substrate may be 1 mm or less.

The thickness of the glass substrate may be 0.3 mm or less.

The base substrate may be a medium density fiberboard (MDF).

The glass laminate may further include a decorative film disposed between the glass substrate and the base substrate.

According to another aspect, an apparatus for cutting a glass laminate includes: a table fixedly holding a glass laminate, the table having a plurality of slots arranged in one direction; a movable unit connected to the table such that the movable unit can move in a lengthwise direction of the slots; a wheel head disposed on the movable unit such that the wheel head can move in a widthwise direction of the slots, the wheel head having a scribing wheel mounted on an end thereof facing the table; a router head disposed on the movable unit such that the router head can move in the widthwise direction of the slots, the router head being positioned next to the wheel head and having a router bit mounted on an end thereof facing the table; a grinding head disposed on the movable unit such that the grinding wheel can move in the widthwise direction of the slots, the grinding head being positioned next to the router head and having a grinding tool mounted on an end thereof facing the table; and a controller operating the movable unit, the wheel head, the router head, and the grinding head.

In this apparatus, the wheel head, the router head, and the grinding head may form a unitary body.

According to the present disclosure as set forth above, a trench line is formed in the surface of the glass substrate, i.e. the uppermost layer of the glass laminate, by scoring the surface of the glass substrate such that the trench line has a depth in the glass substrate, and subsequently the glass laminate is cut along a cutting line set parallel to the trench line. Consequently, cracks that may be formed in a cut portion of the glass substrate by force applied thereto during the cutting of the glass laminate can be blocked by the trench line, thereby being prevented from propagating over the entire area of the glass substrate.

In addition, according to the present disclosure, since the propagation of cracks over the entire area of the glass substrate is blocked, the size of a glass laminate chip manufactured by the cutting operation can be minimized.

Furthermore, the simple process according to the present disclosure can significantly reduce the processing time.

In addition, according to the present disclosure, since an existing cutting tool can be used, processing costs can be reduced.

The methods and apparatuses of the present invention have other features and advantages that will be apparent from or are set forth in greater detail in the accompanying drawings which are incorporated herein, and in the following Detailed Description of the Invention, which together serve to explain certain principles of the present disclosure.

DETAILED DESCRIPTION

Reference will now be made in detail to a method and apparatus for cutting a glass laminate according to the present disclosure, embodiments of which are illustrated in the accompanying drawings and described below, so that a person skilled in the art to which the present disclosure relates could easily put the present disclosure into practice.

Throughout this document, reference should be made to the drawings, in which the same reference numerals and symbols will be used throughout the different drawings to designate the same or like components. In the following description, detailed descriptions of known functions and components incorporated herein will be omitted in the case that the subject matter of the present disclosure is rendered unclear.

Figure 1:
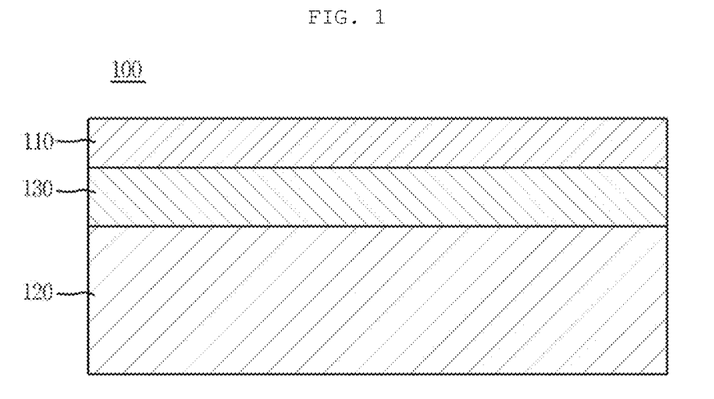
FIG. 1 is a cross-sectional view schematically illustrating a glass laminate to which a method of cutting a glass laminate according to an exemplary embodiment is applied.

Referring to FIG. 1 to FIG. 6, a method of cutting a glass laminate according to an exemplary embodiment is applied to a glass laminate 100 for a piece of furniture or a kitchen door. A glass laminate chip 101 (FIG. 6) is manufactured by cutting a glass laminate 100 (FIG. 1) to have a shape and a size required for a product. As illustrated in FIG. 1, the glass laminate 100 applicable to the furniture or kitchen door has a laminated structure including a rigid base substrate 120, a decorative film 130, and a glass substrate 110. The base substrate 120 may a medium density fiberboard (MDF) having a thickness ranging from 5 to 30 mm. The glass substrate 110 may be a piece of thin or ultra-thin glass having a thickness of 1 mm or less, preferably, 0.3 mm or less. In addition, the decorative film 130 may be a polyvinyl chloride (PVC) film or a polyethylene terephthalte (PET) film having an approximate thickness ranging from 0.05 to 0.5 mm.

Although not illustrated, the glass substrate 110, the decorative film 130, and the decorative film 130 may be bonded to each other by means of an adhesive layer having a thickness ranging from 0.01 to 0.1 mm.

The method for cutting the glass laminate 100 includes a scoring operation and a cutting operation.

Figure 2:
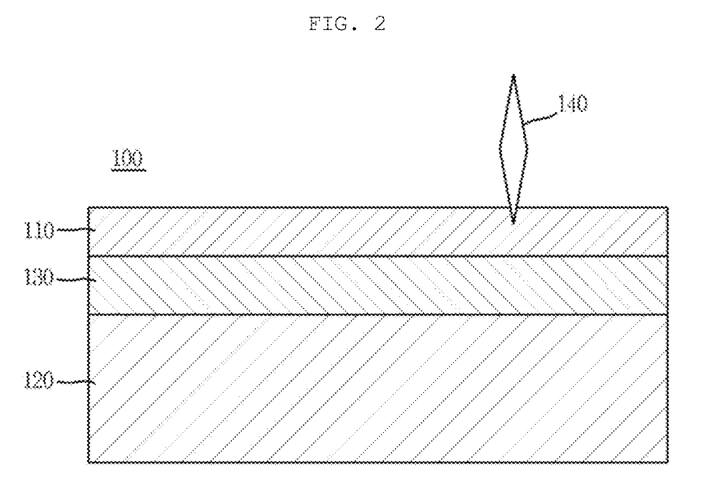
FIG. 2 to FIG. 6 are cross-sectional views sequentially illustrating operations of the method of cutting the glass laminate according to the exemplary embodiment.
Figure 3:
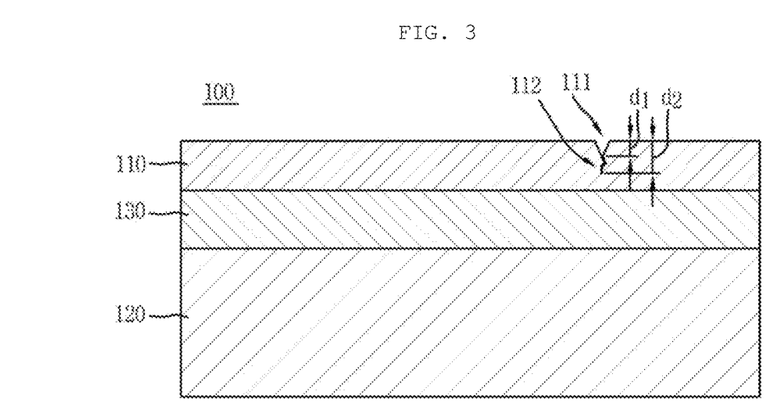

First, as illustrated in FIG. 2 and FIG. 3, in the scoring operation, the surface of the glass substrate 110, i.e. the uppermost layer of the glass laminate 100, is scored. In addition, in the scoring operation, a trench line 111 is formed in one surface of the glass substrate 110 to be parallel to a cutting line, at a distance from the cutting line.

According to the present embodiment, the trench line 111 is formed in the surface of the glass substrate 110 in the scoring operation in order to prevent a crack that will be formed in the subsequent cutting operation from propagating over the entire surface of the glass substrate 110. That is, the trench line 111 serves to block the further propagation of the crack, i.e. to prevent the crack from propagating over the trench line 111. In the scoring operation, it is preferable that the trench line 111 be formed to a depth $d_1$ ranging from 10% to 20% of the thickness of the glass substrate 110. When the trench line 111 is formed in the surface of the glass substrate 110 as above, a median crack 112 may be formed in the portion of the glass substrate 110 under the trench line 111 by force applied thereto, i.e. scoring pressure. The median crack 112 not only serves to block the propagation of the crack together with the trench line 110 but also helps the portion of the glass substrate 110 between a cut section 102 (FIG. 4) and the trench line 111 to be easily separated or removed during the cutting operation. This will be described in greater detail hereinafter.

According to the present embodiment, when the trench line 111 is formed to the depth $d_1$ ranging from 10% to 20% of the thickness of the glass substrate 110, the depth $d_2$ of the median crack 112 from the trench line 111 may range from 10% to 65% of the thickness of the glass substrate 110. The crack-blocking effect is obtained when the depth $d_1$ of the trench line 111 is at least 10% of the thickness of the glass substrate 110. In this case, the depth $d_2$ of the median crack 112 from the surface of the glass substrate 110 will be 10% of the thickness of the glass substrate 110. Specifically, even in the case in which the trench line 111 is formed by applying a small amount of force such that the median crack 112 is not formed, it is possible to block the propagation of the crack, and the critical depth $d_1$ of the trench line 111 initially obtaining the crack-blocking effect is 10% of the thickness of the glass substrate 110. When the trench line 111 is formed such that the depth $d_1$ thereof exceeds 10% of the thickness of the glass substrate 110, the median crack 112 is formed. That is, the depth $d_1$ of the trench line 111 that is 10% of the thickness of the glass substrate 110 is the critical depth of the trench line 111 where the crack-blocking effect is initially obtained while being the maximum depth of the trench line 111 where the medial crack 112 is not formed.

When the depth $d_1$ of the trench line 111 exceeds 20% of the thickness of the glass substrate 110, the depth $d_2$ of the median crack 112 from the surface of the glass substrate exceeds 65% of the thickness of the glass substrate 110. However, this is substantially no different from the case in which the glass substrate 110 is cut. Specifically, when the depth $d_1$ of the trench line 111 exceeds 20% of the thickness of the glass substrate 110, a micro-crack is formed as in the case of cutting the glass substrate, thereby fracturing the glass substrate 110. This consequently lowers the quality of the glass substrate 110, and makes the scoring operation of forming the trench line 111 meaningless. Although the crack-blocking effect occurs from a point at which the depth $d_1$ of the trench line 111 is 10% of the thickness of the glass substrate 110, the crack-blocking effect does not increase with increases in the depth $d_1$ of the trench line 111. Considering process conditions and process costs, it is preferable that the depth $d_1$ of the trench line 111 be 10% of the thickness of the glass substrate 110 or close thereto.

In the scoring operation according to the present embodiment, a scribing wheel 140 (FIG. 1) is used to form the above-described trench line 111. The scribing wheel 140 used to form the above-described trench line 111 may have dimensions as follows: 2.0 (outer diameter)×0.8 (inner diameter)×0.64 (thickness) mm³, 125° with 135 pitches. However, this is not intended to be limiting, since the dimensions may vary depending on the thickness of the glass substrate 110. In the scoring operation, the scribing wheel 140 may be controlled at a rate of 3,000 mm/min and a pressure of 150 g in order to form the trench line 111 having the above-described depth in the surface of the glass substrate 110.

Figure 4:
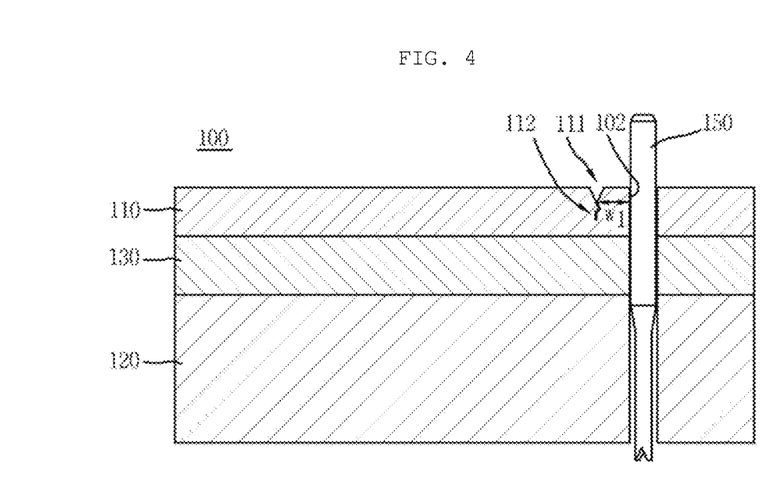

Afterwards, as illustrated in FIG. 4, in the cutting operation, the glass laminate 100 is cut in a direction parallel to the trench line 111 formed by the scoring operation. The former scoring operation is designed for a partial layer of the glass laminate 100, i.e. the uppermost glass substrate 110 of the glass laminate 100. In contrast, the cutting operation is designed for the entirety of the components of the glass laminate 100, i.e. all of the base substrate 120, the decorative film 130, and the glass substrate 110.

Figure 5:
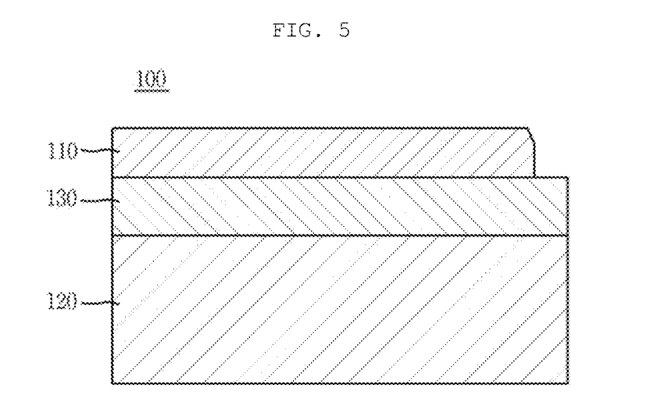

In the cutting operation according to the present embodiment, the glass laminate 100 is cut along a cutting line set parallel to the trench line 111, at a distance of 10 μm to 100 μm from the center of the trench line 111 towards the outer edge of the surface of the glass substrate 110. When the distance $w_1$ between the center of the trench line 111 and the cut section 120 is less than 10 μm, the trench line 111 may be destroyed. As illustrated in FIG. 5, the decorative film 130 and the base substrate 120 protrude sideways beyond the glass substrate 110 after the cutting operation, since the portion of the glass substrate 110 between the center of the trench line 111 and the cut section 102 is separated or removed from the glass laminate 100 during the cutting operation. When the distance $w_1$ between the center of the trench line 111 and the cut section 120 exceeds 100 μm, the base substrate 120 protrudes beyond the glass substrate 110 by an amount corresponding to the distance $w_1$. Thus, a significant amount of time for machining the base substrate 120 is required in order to manufacture the glass laminate chip 101 illustrated in FIG. 6 from the structure illustrated in FIG. 5.

In the cutting operation according to the present embodiment, the glass laminate 100 can be cut using, for example, a router bit 150. The router bit 150 used in the cutting operation may be a router bit having a diameter of 3 mm and 1 to 9 downward flutes. In addition, in the cutting operation, it is possible to cut the glass laminate 100 using the router bit 150 at a maximum rate of 3 m/min.

When the glass laminate 100 is cut along the cutting line set parallel to the trench line 111, at a distance ranging from 10 μm to 100 μm from the trench line 111, the trench line 111 blocks the propagation of a crack formed in the cut portion by force applied thereto during the cutting operation. This can consequently prevent the crack from propagating over the entire surface of the glass substrate 110.

When the cutting operation is completed as illustrated in FIG. 5, the portion of the glass substrate 110 between the center of the trench line 111 and the cut section 102 is separated or removed from the glass laminate 100 by impacts occurring during the cutting operation. Consequently, after the completion of the cutting operation, the glass laminate 100 is configured such that the decorative film 130 and the base substrate 120 protrude sideways beyond the glass substrate 110. The present embodiment may further include an operation of polishing the cut section 102 of the glass laminate 100 in order to remove the stepped portion, i.e. the portion of the glass laminate 100 that protrudes sideward. In the polishing operation, the stepped portion is removed by polishing the portion of the decorative film 130 and the portion of the base substrate 120 that protrude sideward beyond the glass substrate 110.

Figure 6:
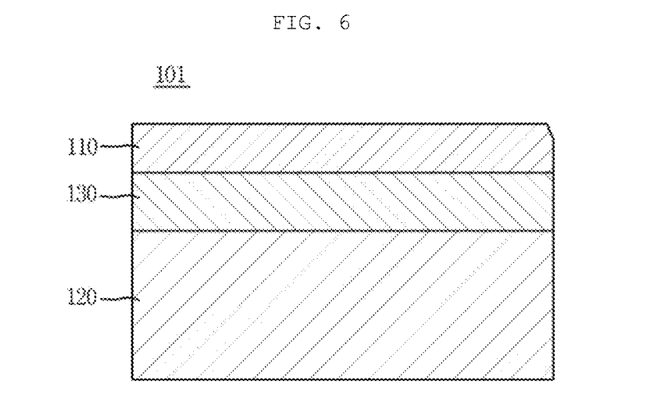

As illustrated in FIG. 6, the completion of the polishing operation produces a glass laminate chip 101 satisfying the shape and size required for a product to which the glass laminate chip 101 is to be applied. According to the present embodiment, the propagation of the crack is prevented by the trench line 111, whereby the size of the glass laminate chip 101 manufactured by cutting the glass laminate 100 can be minimized. In addition, according to the present embodiment, it is possible to manufacture the glass laminate chip 101 by the simple process of the scoring operation, the cutting operation, and the polishing operation, thereby significantly reducing the processing time. Since existing cutting tools, such as the scribing wheel 140 and the router bit 150, are used, no additional costs are required. In addition, manufacturing costs can be reduced compared to those incurred in laser cutting.

Figure 7:
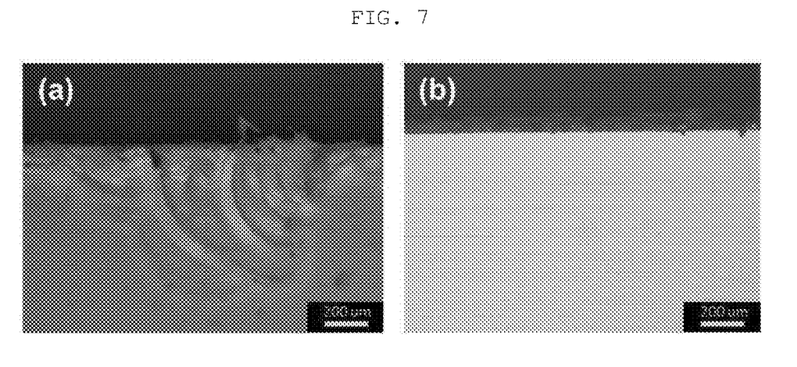
FIG. 7 shows a photograph (a) illustrating a cut section of a glass laminate on which only the cutting operation has been performed, and a photograph (b) illustrating a cut section of a glass laminate on which both the scoring operation and the cutting operation have been sequentially performed (b)

FIG. 7 shows a photograph (a) illustrating the cut section of a glass laminate on which only the cutting operation has been performed, and a photograph (b) illustrating the cut section of a glass laminate on which both the scoring operation and the cutting operation have been sequentially performed. Referring to FIG. 7, the crack-blocking effect obtained by the trench line formed in the scoring operation can be visually recognized.

Hereinafter, an apparatus for cutting a glass laminate according to an exemplary embodiment will be described with reference to FIG. 8.

Figure 8:
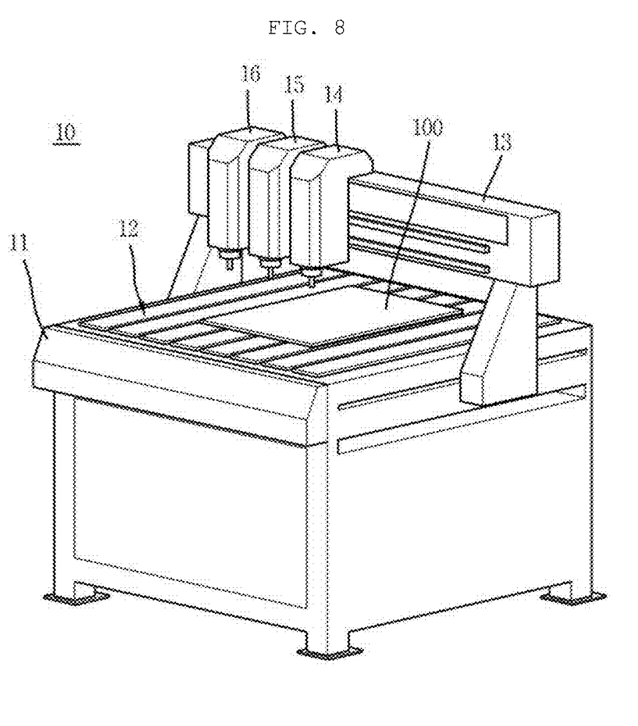
FIG. 8 is a perspective view schematically illustrating an apparatus for cutting a glass laminate according to an exemplary embodiment.

The method of cutting a glass laminate according to the present embodiment can be realized using the apparatus 10 for cutting a glass laminate illustrated in FIG. 8. For this, the apparatus 10 for cutting a glass laminate includes a table 11, a movable unit 13, a wheel head 14, a router head 15, a grinding head 16, and a controller (not shown).

A glass laminate 100 is fixedly held to the table 11. Here, the table 11 has a plurality of slots 12 arranged in one single direction. In order to cut the glass laminate 100 in the top-bottom direction, a router bit (150 in FIG. 4) mounted on the distal end of the router head 15 must move downwardly below the bottom surface of the glass laminate 100. The slots 12 provide spaces in which the router bit 150 (FIG. 4) can move downwardly.

The movable unit 13 is connected to the table 11, and is able to reciprocate in the lengthwise direction of the slots 12. The movable unit 13 moves the wheel head 14, the router head 15, and the grinding head 16 mounted thereon in the lengthwise direction of the slots 12, and guides the wheel head 14, the router head 15, and the grinding head 16 to move in the widthwise direction of the slots 12. The reciprocating movement of the movable unit 13 can be controlled by a controller (not shown) electrically connected thereto.

The wheel head 14 is disposed on the movable unit 13 such that the wheel head 14 can reciprocate in the widthwise direction of the slots 12. In addition, as the movable unit 13 moves in the lengthwise direction of the slots 12, the wheel head 14 can move on the table 11 in a cross pattern. The scribing wheel 140 (FIG. 2) is mounted on an end of the wheel head 14 facing the table 11 such that the scribing wheel 140 (FIG. 2) can rotate and move in the upward-downward direction. The scoring operation according to the present embodiment can be realized using the wheel head 14 with the scribing wheel 140 (FIG. 2) mounted on the end thereof.

The router head 15 is disposed on the movable unit 13, in a position next to the wheel head 14, and operates in the same manner as the wheel head 14. The router bit 150 (FIG. 4) is mounted on an end of the router head 15 facing the table 11 such that the router bit 150 (FIG. 4) can rotate and move in the upward-downward direction. The cutting operation according to the present embodiment can be realized using the router head 15 with the router bit 150 (FIG. 14) mounted on the end thereof.

The grinding head 16 is disposed on the movable unit 13, in a position next to the router head 15. Thus, the wheel head 14, the router head 15, and the grinding head 16 are sequentially disposed on the movable unit 13. The grinding head 16 operates in the same manner as the wheel head 14 and the router head 15. A grinding tool (not shown) is mounted on an end of the grinding head 16 facing the table 11 such that the grinding tool (not shown) can rotate and move in the upward-downward direction. The grinding operation according to the present embodiment can be realized using the grinding head 16 with the grinding tool (not shown) mounted on the end thereof.

Like the movable unit 13, the operations of the wheel head 14, the router head 15, and the grinding head 16 and the operations of the scribing wheel 140 (FIG. 2), the router bit 150 (FIG. 4), and the grinding tool (not shown) mounted on the ends thereof can be controlled by the controller (not shown) electrically connected thereto.

The method of cutting a glass laminate according to the present embodiment may be realized using the above-described apparatus 10 for cutting a glass laminate. However, this is merely illustrative and is not intended to be limiting. Specifically, in the above apparatus 10 for cutting a glass laminate, the wheel head 14, the router head 15, and the grinding head 16 are respectively disposed on the movable unit 13, independently of each other. In contrast, the wheel head 14, the router head 15, and the grinding head 16 may form a unitary body disposed on the movable unit 13.

TABLE 1

| Wheel pressure (MPa) | Trench line depth[1] (%) | Median crack depth[2] (%) |
|---|---|---|
| 0 | 0.0 | 0.0 |
| 0.01 | 0.0 | 0.0 |
| 0.02 | 6.4 | 0.0 |
| 0.03 | 10 | 0.0 |
| 0.05 | 11.1 | 47.9 |
| 0.07 | 12.9 | 60.3 |
| 0.09 | 13.8 | 64.0 |
| 0.11 | 13.4 | 67.7 |
| 0.13 | 18.4 | 64.0 |
| 0.15 | 20 | 65 |

Figure 9:
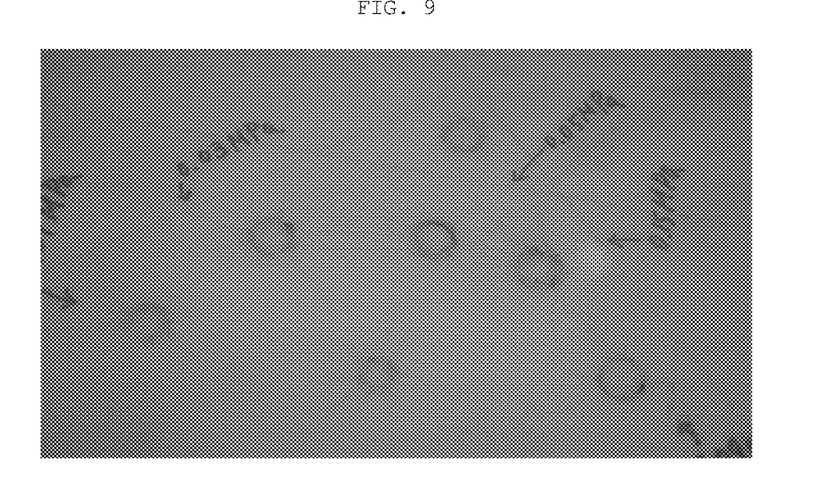
FIG. 9 is a photograph illustrating ball drop test results depending on scoring pressures in order to determine the crack-blocking effects of trench lines.

Notes:
Trench line depth[1]: Depth of trench line with respect to thickness of glass
Median crack depth[2]: Depth of median crack with respect to the thickness of glass Table 1 above represents the measurement results of the depth (%) of a trench line and the depth (%) of a median crack depending on variations in a wheel pressure Mpa in order to determine crack-blocking effects depending on whether or not the trench line and the median crack are formed, and the depths thereof. For measurements, a piece of glass having a thickness of 0.3 mm was used. In addition, as in the photograph of FIG. 9, a ball drop test was performed with respect to the wheel pressure MPa in order to visually determine whether or not a crack propagated, i.e. the crack-blocking effects depending on the existence of the trench line and the median crack and the depths thereof. Here, the ball drop photograph of FIG. 9 illustrates results regarding the upper and lower limits of pressure in which the propagation of the crack is blocked. In addition, FIG. 10 is a graph comprehensively illustrating test results regarding the depth (%) of the trench line and the depth (%) of the median crack, depending on variations in the wheel pressure MPa and the results of the ball drop test.

Figure 10:
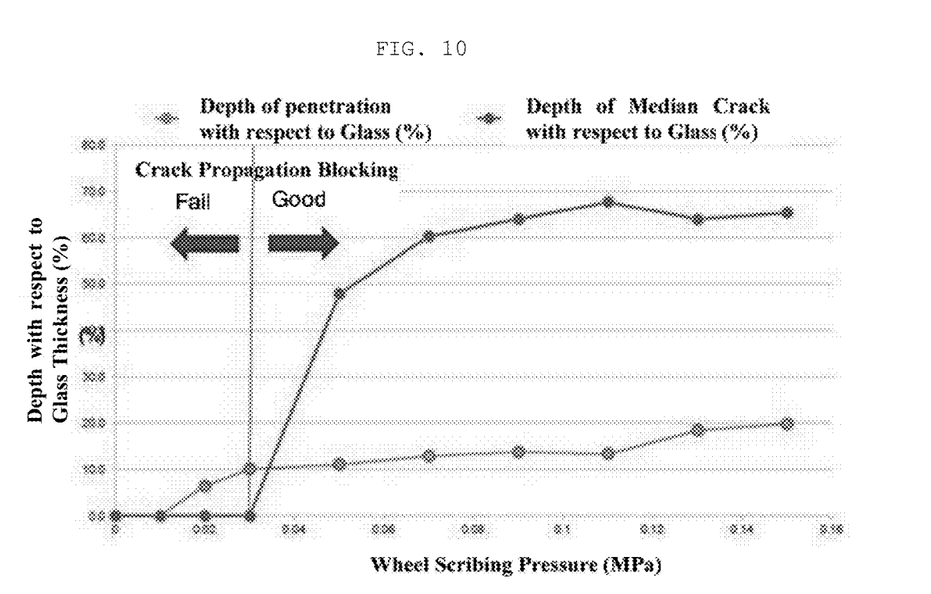
FIG. 10 is a graph illustrating variations in the depth of the trench line and the depth of the median crack, depending on scoring pressures.

Referring to Table 1, FIG. 9, and FIG. 10, the trench line was determined to have a crack-blocking effect when the depth of the trench line was 10% or greater with respect to the thickness of the glass. In this case, when the depth of the trench line was 10% with respect to the thickness of the glass, the median crack was not formed, but the propagation of the crack was blocked. Considering this, the depth of the trench line was determined to be the most important factor to realize the crack-blocking effect. The depth of the trench line equal to 10% of the thickness of the glass, in which no median crack was formed, is the critical depth in which the crack-blocking effect was initially realized. It was observed that median cracks were formed in the entire range in which the depth of the trench line exceeded 10% of the thickness of the glass, and that the propagation of the crack was blocked in the entire range in which the median cracks were formed. It is possible to determine whether or not the propagation of the crack is blocked, depending on the depth of the trench line and whether or not the median crack was formed.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A method of cutting a glass laminate comprising:
   forming a trench line in a surface of a glass substrate that is an uppermost layer of a glass laminate by scoring the surface of the glass substrate; and
   cutting the glass laminate in a direction parallel to the trench line wherein cutting the glass laminate is performed such that a distance between a cut section of the glass laminate and a center of the trench line ranges from 10 µm to 100 µm.

2. The method of claim 1, wherein the trench line is formed to a depth ranging 10% to 20% of a thickness of the glass substrate.

3. The method of claim 2, wherein the forming the trench line is performed such that a median crack is formed under the trench line in the glass substrate.

4. The method of claim 3, wherein a depth of the median crack from the surface of the glass substrate ranges from 10% to 65% of the thickness of the glass substrate.

5. The method of claim 1, wherein the scoring the surface of the glass substrate is performed using a scribing wheel.

6. The method of claim 1, wherein the cutting the glass laminate is performed using a router bit.

7. The method of claim 1, further comprising, after the cutting the glass laminate, polishing a cut section of the glass laminate.

8. The method of claim 1, wherein the glass laminate further comprises a base substrate bonded to the glass substrate.

9. The method of claim 8, wherein a thickness of the glass substrate is 1 mm or less.

10. The method of claim 9, wherein a thickness of the glass substrate is 0.3 mm or less.

11. The method of claim 8, wherein the base substrate comprises a medium density fiberboard.

12. The method of claim 11, wherein the glass laminate further comprises a decorative film disposed between the glass substrate and the base substrate.

13. An apparatus for cutting a glass laminate comprising:
   a table comprising a plurality of slots arranged in one direction;
   a movable unit connected to the table such that the movable unit can move in a lengthwise direction of the slots;
   a wheel head disposed on the movable unit such that the wheel head can move in a widthwise direction of the slots, the wheel head comprising a scribing wheel mounted on an end thereof facing the table;
   a router head disposed on the movable unit such that the router head can move in the widthwise direction of the slots, the router head positioned next to the wheel head and comprising a router bit mounted on an end thereof facing the table;
   a grinding head disposed on the movable unit such that the grinding head can move in the widthwise direction of the slots, the grinding head positioned next to the router head and comprising a grinding tool mounted on an end thereof facing the table; and
   a controller operating the movable unit, the wheel head, the router head, and the grinding head.

14. The apparatus of claim 13, wherein the wheel head, the router head, and the grinding head form a unitary body.

* * * * *

UNITED STATES PATENT AND TRADEMARK OFFICE
CERTIFICATE OF CORRECTION

PATENT NO. : 10,737,968 B2  
APPLICATION NO. : 15/749245  
DATED : August 11, 2020  
INVENTOR(S) : Sang Jin Hong et al.

Page 1 of 1

It is certified that error appears in the above-identified patent and that said Letters Patent is hereby corrected as shown below:

On the Title Page

In Column 1, item (72), Inventors, Line 4, delete "Hwasung" and insert -- Hwaseong --, therefor.

Signed and Sealed this  
Tenth Day of November, 2020

Andrei Iancu  
*Director of the United States Patent and Trademark Office*